United States Patent [19]

Simon

[11] Patent Number: 5,113,453

[45] Date of Patent: May 12, 1992

[54] CHARACTER RECOGNITION METHOD AND APPARATUS

[75] Inventor: Jean-Claude Simon, Paris, France

[73] Assignee: Etat Francais Represente par le Ministre des postes et Telecommunications Centre National d'Etudes des Tellecommunications, Issy Les Moulineaux, France

[21] Appl. No.: 523,257

[22] Filed: May 14, 1990

Related U.S. Application Data

[63] Continuation of Ser. No. 131,890, Dec. 11, 1987, abandoned.

[30] Foreign Application Priority Data

Dec. 12, 1986 [FR] France .................. 86 17436

[51] Int. Cl.⁵ .............................................. G06K 9/46
[52] U.S. Cl. .................................. 382/24; 382/16; 382/25
[58] Field of Search .................. 382/21, 25, 26, 48, 382/24, 16

[56] References Cited

U.S. PATENT DOCUMENTS

| | | | |
|---|---|---|---|
| 4,712,248 | 12/1987 | Hongo | 382/16 |
| 4,718,090 | 1/1988 | Cooper, Jr. | 382/26 |
| 4,771,474 | 9/1988 | Takashima et al. | 382/25 |

OTHER PUBLICATIONS

Automatic Interpretation and Classification of Images, a NATO Advanced Study Institute, Edited by A. Grasselli, 1969, Academic Press, New York: J. R. Parks: "A Multi-Level System of Analysis for Mixed-font and Hand-Blocked Printed Characters Recognition", pp. 295-322.

Patent Abstracts of Japan, vol. 8, No. 6, p. 247, Jan. 12, 1984.

Pattern Recognition, vol. 3, 1971, pp. 345-361, Pergamon Press, GB, R. Narashimhan et al: "A syntax-aided recognition scheme for handprinted English letters".

The Marconi Review, vol. 32, Nos. 172-175, Jan.-Dec. 1969, pp. 82-104, Chelmsford, Essex, GB; J. Thompson et al: "Experimental multifont page reader".

Primary Examiner—David K. Moore
Assistant Examiner—Yon Jung
Attorney, Agent, or Firm—Foley & Lardner

[57] ABSTRACT

An image system (SPI) provides an image file which is recorded in a memory (3). A segmentation and framing module (M1) isolates each of the characters in the image file within individual matrices. A module (M2) finds primitive shapes in each character matrix by initially finding strokes therein and then substracting the strokes from the matrix. A module (M3) then makes a description of primitive shapes in the form of at least one partially ordered list of primitive shapes, and a module (M4) compares said description with standard description expressed in the same manner in a data base (M5). Character recognition, per se, is performed by determining the distances between the description of a character to be identified and the standard descriptions.

14 Claims, 4 Drawing Sheets

CHARACTER RECOGNITION METHOD AND APPARATUS

This application is a continuation of application Ser. No. 07/131,890 filed Dec. 11, 1987.

The invention relates to character recognition.

BACKGROUND OF THE INVENTION

The following solutions to this contemporary problem are already known:

So-called "dedicated" optical readers have been developed for particular applications, and are used in highly limited contexts. This category includes, in particular, devices for automatically reading postal addresses for automated sorting, devices for providing assistance to the blind, and digital inputting devices for banks.

Optical readers which are limited to a few fonts of characters, which are of wider application since such machines are capable of reading a limited number of character fonts, and which can be used in particular in an office environment or for electronic mailing. As a general rule, the documents that can be read by this type of machine must satisfy rather restrictive quality conditions concerning inking and contrast, for example.

Optical readers capable of reading a wide range of fonts. These machines are more advanced than the above machines in that they are capable of learning to read a new character font. This improvement in reading performance is offset by a nonnegligible learning time. Further, the quality required of documents being read is similar to that in the preceding case.

Under these conditions, it is clear that genuinely satisfactory character recognition means are not currently available.

Dedicated machines suffer from a very limited field of application, and in addition they need to make direct contact with the documents they read which constitutes yet another limitation.

The most important constraint on the other two types of machine lies in the quality of printing required: for example it is difficult to process photocopies which is a considerable handicap in office-type applications, in electronic mail, or in in-house communications.

With the second type of machine, the fact that the number of fonts which can be recognized is limited is also a handicap since it is impossible, outside certain special situations, to enforce the use of a standard policy for general application.

As for the third type of machine, their major drawback lies in learning which is expensive in time, and it should also be observed that it is not easy to check that the results are good after learning has taken place. All of this reduces the flexibility of a system in use.

The aim of the present invention is to remedy the drawbacks of existing equipment.

One of the aims of the invention is to provide character recognition means which are "multi-font" and capable even of reading handwriting providing the handwritten characters are isolated (block letters) or are at least separable.

Correspondingly, another aim of the invention is to make it possible to establish invariant representations of characters, i.e. representations which are independent of the particular character font being used.

The invention also seeks to provide character recognition means which are invariant with respect to the width of character strokes, character size, serifs, and to some extent of orientation in order to be able to recognize italic or slanting characters as well.

In other words, the invention seeks to provide character recognition means capable of being easily integrated into any system that requires such character recognition.

Further, the invention also aims to provide means capable of being applied equally well to character images which are "black and white", i.e. in which optical intensity is expressed as an on or an off, and to images having a gray scale. This makes it possible to escape from the requirement for high quality in the original document being processed.

SUMMARY OF THE INVENTION

To do this, the present invention provides firstly a method of processing digital signals representative of image lines, and in particular of characters, the method being of the type in which:

a) each elementary shape or character is isolated, and is framed in a matrix having a predetermined configuration, in particular a rectangular configuration; and b) a search is performed inside the matrix for primitive shapes of predetermined types, said shapes being referred to as first level primitive shapes;

the method being characterized in that operation b) comprises:

b1) a search is performed inside the matrix for strokes; and b2) the strokes recognized in this way are subtracted from the matrix, thereby leaving characteristic zones containing said primitive shapes.

According to another aspect of the invention, operation b1) comprises:

b11) a search for quanta, with each quantum being defined as a homogeneous block having a minimum number of pixels whose intensity is greater than a local threshold; and b12) detecting a sequence of overlapping quanta as being representative of a stroke.

More particularly, step b11) comprises:

scanning through the matrix by means of at least one predetermined line which is moved parallel to itself in translation, with a current run being defined by the stack of pixels encountered by the scanning line and having an intensity greater than the background intensity, said current run being considered as a first run at the beginning of scanning;

searching for contacts between the current run, one or more upstream runs, and also one or more downstream runs in the scanning direction; and recognizing that a quantum is present when a predetermined contact condition is satisfied between adjacent runs.

According to another aspect of the invention, the so-called first level primitive shapes comprise:

the ends of strokes;

changes in direction;

cusps;

crosses or branching points having at least three branches; and closed loops.

In theory, closed loops can be detected by conventional means. However, the other four types of primitive shape are detected by stroke subtraction means in accordance with the invention.

In addition, primitive shapes thus located in characteristic zones are encoded not only as to their nature, but also depending on the direction(s) of the stroke(s) ending at the characteristic zones.

According to a complementary aspect of the invention, the method further includes:

c) scanning the characteristic zones by means of at least one line having predetermined motion, in order to establish an ordered list of characteristic zones each having one of the primitive shapes identified therein; and d) comparing said list of primitive shapes obtained in this way with a set of character descriptions contained in memory, and likewise expressed taking account of the predetermined motion of the scan line(s).

Scanning may take place using straight lines or curved lines passing through a fixed point (e.g. the center of gravity) or a point at infinity (translation).

A special characteristic of the invention consists in providing for the lists of primitive shapes processed in this way to be ordered partially, i.e. shapes which are encountered simultaneously during scanning are collected together in any order, in particular by means of parentheses.

Highly advantageously, each matrix is subjected to at least two predetermined scans, which are associated with respective partially ordered lists, said lists being compared with partially ordered lists contained in memory, with each character or shape to be recognized being associated with at least one such list.

It is advantageous for the lists constituting the descriptions contained in memory to be classified by non-disjoint classes Ai.

The identification class or classes Ai is/are determined by interrogating the list(s) of the unknown character. For example: presence or absence of characteristics such as loops, crosses, etc.

The comparison may be accelerated by the fact that memory searching is performed using the presence of crosses or branching points in the list and the length of the list as basic search criteria.

According to another aspect of the invention, the lists obtained are compared with the lists in the memory by calculating the distance between lists of characters to be compared within a class Ai.

Preferably, in accordance with the invention, when said distance exceeds a threshold, the following steps are performed:

e) the character to be identified is eroded in order to reduce its thickness (with the word "character" being used herein as a simple designation for any set of strokes in the matrix and contrasting with the background, but it is clear that a specific character has not yet been identified); and f) steps b) to d) are performed again.

The invention also provides apparatus for implementing the above method, said apparatus comprising, in combination:

means for segmenting and framing characters, said means being suitable for receiving image data from an imaging system;

means for recognizing primitive shapes by subtracting strokes;

means for describing the primitive shapes as at least one list which is in general partially ordered;

means for storing character descriptions in the forms of predetermined parenthesized reference lists;

means for comparing the lists obtained with the reference lists; and means for identifying a character as matching the character which gives the smallest distance between the lists obtained and the reference lists.

This apparatus is suitable for incorporating all of the characteristics mentioned above in method terms.

In particular, the apparatus may additionally include fining means suitable for reducing character thickness (under the same conditions as above) prior to reapplying the means for recognizing primitive shapes.

BRIEF DESCRIPTION OF THE DRAWINGS

An implementation of the invention is described by way of example with reference to the appendices included after the description per se and also with reference to the accompanying drawings, in which.

In numerous respects, the accompanying drawings include items which are definitive in nature, in particular of geometry. Consequently, the drawings may serve not only for improving understanding of the detailed description, but also for contributing to defining the invention, whenever necessary.

MORE DETAILED DESCRIPTION

Figure 1:
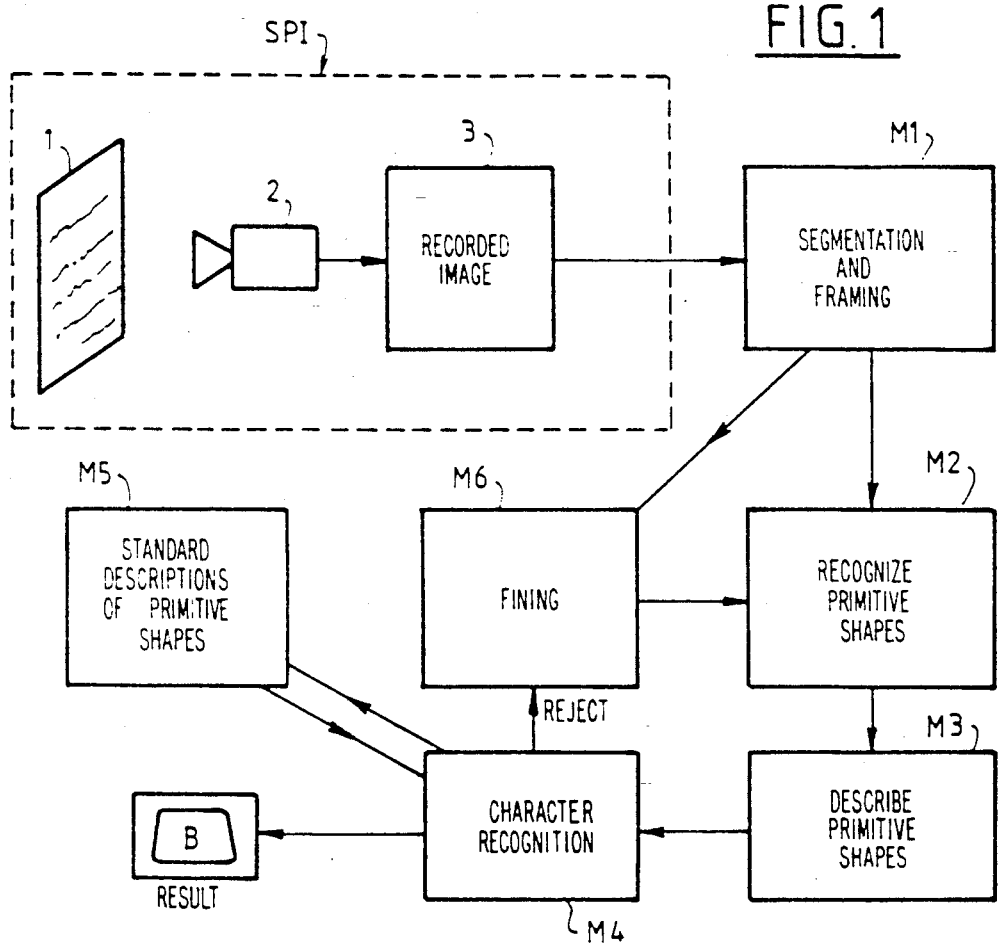
FIG. 1 is an overall block diagram of character recognition apparatus in accordance with the invention.

In FIG. 1, reference 2 designates a camera connected to a memory 3 suitable for containing the recorded image of a document 1 having characters written thereon, which characters may be printed or handwritten.

The image memory is connected to segmentation and framing means M1. (The term "module" is used below for referring to the various different means used in accordance with the invention.) This module M1 is connected to a module M2 for recognizing primitive shapes, which in turn transmits information to a module M3 for describing primitive shapes.

Character recognition module M4 is then invoked to compare the description of primitive shapes obtained by module M3 with standard or reference descriptions contained in a module M5. If the comparison is successful, i.e. if it satisfies certain proximity criteria, then a result is obtained, for example printed character B.

Otherwise, if the comparison fails, it is possible to use a fining module M6 to erode a character as segmented and framed by the module M1 so that module M2 can be reapplied to the character after it has been subjected to this treatment.

It may be mentioned here that this fining process has considerably improved the effectiveness of character recognition apparatus in accordance with the invention.

An imaging system such as that shown in FIG. 1 gives rise to a digital representation of an image in the form of digital samples which are nowadays called "pixels".

These samples may be of the on/off type, in which case each pixel has only one bit. Alternatively they may take account of several different degrees of optical density in the document, i.e. several gray levels, in which case each pixel is associated with a plurality of bits.

The person skilled in the art knows how to dispose pixels at the intersections of a matrix which may be square, or triangular, for example. This operation of placing each pixel of an image at an intersection of a matrix is often called "tessellation".

In addition to such tessellation, the module M1 also has the function of segmenting characters, i.e. of isolating them one-by-one in respective rectangular matrices. For example, a printed character can be properly represented in a rectangular matrix of 20 pixels by 30 pixels, which corresponds to a total definition of 300 to 600 pixels per character. It should be observed that the character should not touch the edges of the matrix in question which are considered as having the background level of the image as obtained by the imaging system.

The module M1 may be made in any manner known to the person skilled in the art.

It is merely mentioned here that the background level may be defined, for example, by taking the average level of all the pixels in a character-framing matrix, since it may be observed that a character occupies only a small fraction of the area of the matrix in which it is contained.

With the background defined in this way, an object (which may become a character) is represented by pixels having values that differ from the background value. The following rule may be adopted, for example: where it intersects the object, no straight line (a vertical line or a horizontal line if the matrix is a square matrix) should have less than three (exceptionally two) pixels with a value that is different from the background value. Naturally, any line may have more such pixels.

Figure 2:
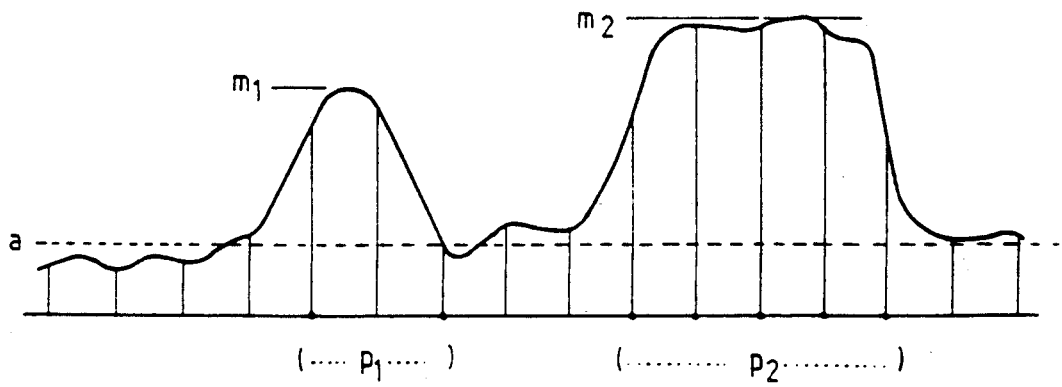
FIG. 2 is a diagram showing how pixels are identified relative to a background.

FIG. 2 shows an example of a horizontal straight line scan giving two adjacent pixels having a maximum level $m_1$ above the background level as shown at $p_1$, followed by five adjacent pixels going up to a maximum level $m_2$ above the background level and forming a set of pixels $p_2$. The pixel sets or runs $p_1$ and $p_2$ obtained when scanning a matrix along a line constitute the elements of an object which are useful for character recognition purposes.

Attention is now turned to module M2 which serves to recognize primitive shapes.

Proposals have already been made to use primitive shapes in the field of character recognition. This consists in defining character recognition independently of the variations that may be encountered concerning specific representations of characters, which variations relate in particular to the font, the degree of inking, to possible geometrical transformations, and to deformations.

The invention uses first level primitive shapes which are selected because of their invariance under such transformations. These first level primitive shapes are the following:
a) the ends of strokes;
b) changes in direction;
c) cusps;
d) crosses or branching points having three or more branches; and
e) closed loops.

In the past, the person skilled in the art has not been able to find a method using such primitive shapes without giving rise to serious errors.

In accordance with the present invention, loops (primitive shape e) may be detected by the usual means. However, primitive shapes a) to d) are detected in a novel manner.

Instead of searching for the primitives in question directly, they are obtained by a complementary method:
a search is made for strokes within the matrix of an object; and
the strokes recognized in this way are subtracted from the matrix of the object, thereby leaving the characteristic zones containing said primitive shapes.

In each characteristic zone, the primitive shape contained therein is identified, and the manner in which it is connected to the stroke(s) terminating thereat is determined.

This is made possible by using a line or stroke detector which is extremely effective and which is described below.

Figure 5:
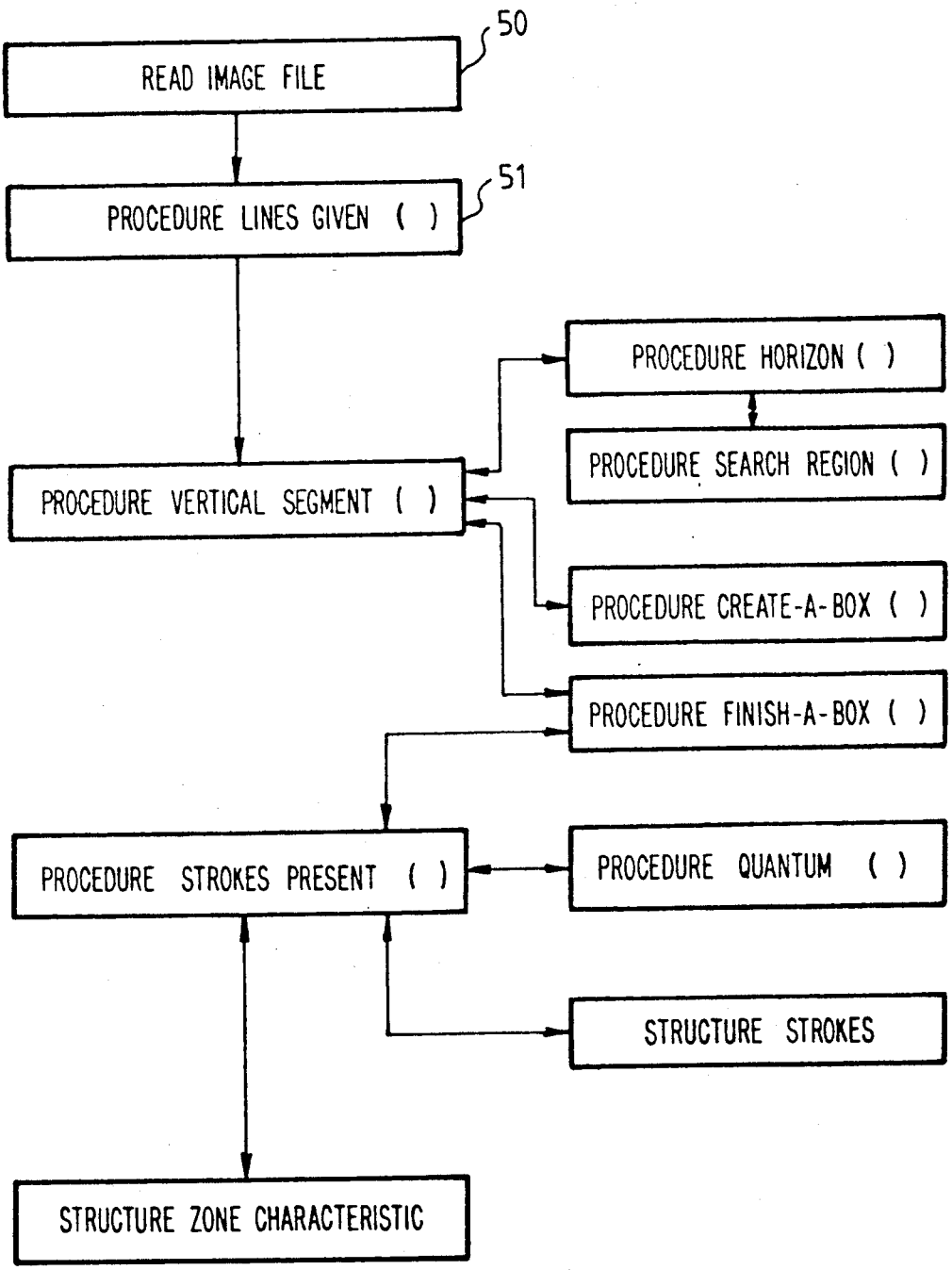
FIG. 5 is a flow chart showing the relationships between the various processing means in accordance with the invention.

The first step of the method in accordance with the invention consists in reading the image file recorded in the memory 3, with this read operation being referenced 50 in FIG. 5.

This operation is followed by a procedure called linesgiven() which constitutes step 51 in FIG. 5.

This procedure linesgiven () has the function of initializing global parameters from data read in the image file. It also provides the interface between the image data acquisition system and the character recognition system in accordance with the invention.

The source file may contain any number of sampled images at various different sizes. The format of a sampled image is as follows:
a four-byte integer defining the number of image lines and called nl—image;
a four-byte integer defining the number of image columns and called nc—image; and
a one-byte unsigned character defining the gray level of the image background.

The total number of pixels in the image is given by the product nl—image*nc—image. These pixels are stored line-by-line.

The procedure linesgiven() uses pointers image and trance as global variables. The first pointer, image, points to MATOCTET structures for storing the image to be processed, while the second pointer trace points to a trace of the work performed by executing the method in accordance with the invention.

This produces a matrix TRACE which is pointed to by the pointer trace, and which contains the pixel interpretation code to which we return below with reference to an example shown in FIGS. 3A and 3B.

Other global variables include the above-defined nl—image and nc—image, and also contraste which indicates the maximum difference between pixel values (in terms of optical intensity) and the background value.

The procedure linesgiven () also makes use of local variables as follows:
fond designating the gray level of the image background, which value may be estimated, for example, as being equal to the average gray level of the image border; and
i and j which are loop variables.

The procedure linesgiven() given formally under subheading AA in the appendix. The person skilled in the art will recognize in the formal description of the procedure linesgiven(), as in the other formal descriptions given in the appendix, that the formalization is applicable to the C language.

The first four lines of this procedure (AA1 to AA4) need no explanation.

At line AA10 the image matrix is initialized for the present values of the loop variables i and j.

The next two lines compare each pixel of the image matrix with the background for the purpose of subsequently calculating the contrast at line AA13.

This is repeated until there is no more data to be processed, which condition is tested by the first four lines of the procedure linesgiven().

The effect of the procedure linesgiven() is to detect significant elements in the recorded image relative to the background of the image as expressed in a local manner.

The method in accordance with the invention then continues by implementing two scanning procedures, which may be vertical scanning and horizontal scanning in the case of a matrix which is rectangular.

The vertical scan uses a procedure called verticalsegment to scan the image line by line. Similarly, the horizontal scan uses a procedure called horizontalsegment to perform a horizontal column-by-column scan of the image. The procedure horizontalsegment is not described in detail since it is symmetical to the procedure verticalsegment with the roles of lines and columns being interchanged.

For each line, the procedure verticalsegment calls a subprocedure horizon() which searches for runs on the current line. A run is constituted by a set of adjacent pixels which are taken to be significant, i.e. pixels which are distinguished from the local value of the image background.

The runs found contribute to forming subobjects referred to as "boxes" and which comprise sequences of adjoining runs without branching. It is seen below that when such a subobject or box is formed, the procedure verticalsegment calls a procedure strokepresent which has the function of detecting the presence of strokes within the previously-identified box or subobject.

In addition, the connections between the boxes make it possible to detect loops, if any.

We begin by considering the procedure verticalsegment, which is shown formally in the C language under subheading BB in Appendix 2.

The global variable of this procedure is the number of image lines: nl—image.

Its local variables are as follows:

firstpave which is a pointer to the head of the list of subobjects contained in the image;

runpave which indicates the current element under consideration in this list of subobjects;

newpave which designates a new subobject to be inserted in the list of boxes;

bouhau, boubas which are two pointers for use when searching for loops; and buff[] which is a vector containing run beginnings and run ends encountered on the current line.

Figure 6A:
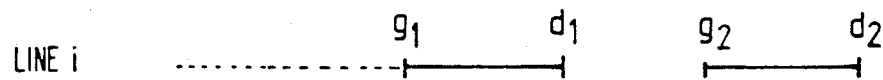
FIGS. 6A, 6B, 7A, 7B, 8A, and 8B show various different situations relating to scan runs in the preceding scan line and in the current scan line.

If a current line is taken by way of example as having the runs shown in FIG. 6A, then the state of the vector buff is:

buff[0] = g1
buff[1] = d1
buff[2] = g2
buff[3] = d2
buff[4] = COLMAX where g1, d1, g2, and d2 are the column numbers of the beginnings and the ends of successive runs encountered and COLMAX is the highest column number.

Figure 6B:
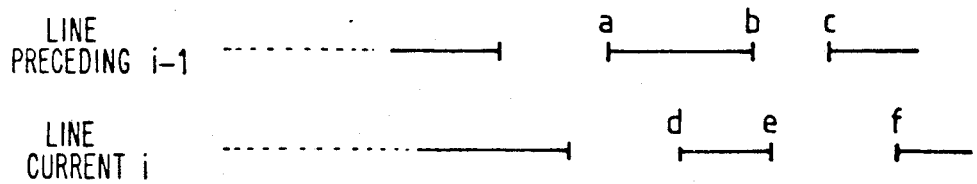

Its local variables further include values a, b, c, d, e, and f which are column indices for the current runs, with the first three indices applying to the preceding line of index i = 1, and with the other three indices applying to the current line of index i, as shown in FIG. 6B.

In section BB of the appendix, it can be seen that the procedure verticalsegment comprises a first step consisting in initializing the variables (line BB1).

Its second step consists in scanning the image matrix so as to mark the beginnings and the ends of the runs (the current runs) of the preceding line, and then to detect the runs on the new line, which is referred to as the "current" line (see BB5), and this is done by making use of another procedure horizontal(i,buff).

After performing the procedure horizon(), d, e, and f can then be put at the beginnings of the "current" runs in the current line, and in the present case at the beginnings and at the ends of runs since runs both of data points and of background points are taken into consideration.

The WHILE loop beginning at BB7 ensures that all of the runs of the preceding line or of the current line are scanned.

Figure 7A:
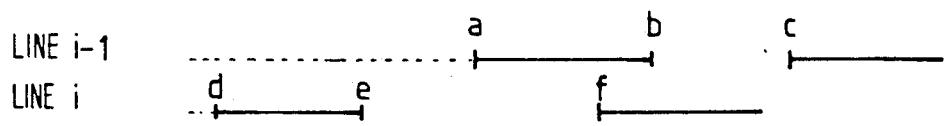

The current run is the run beginning at index d and ending at index e. If e is less than the run beginning a situated on the preceding line (FIG. 7A), the current box which contains the run (a,b) of the preceding line is put to one side and a new box is begun which is created starting from the run (d,e) of the current line.

The procedure for creating a current box (create-a-box() is described below.

Figure 7B:
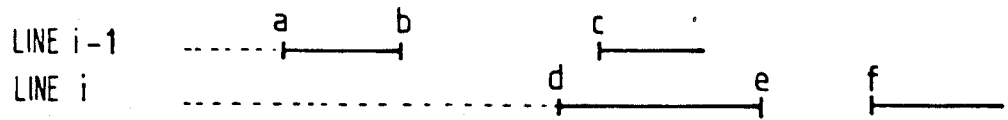

Otherwise, if the beginning of the black run encountered on the current line with index d is situated between two limits of disjoint runs in the preceding line, i.e. between b and c (see FIG. 7B), then the current box terminates with (a,b), and an end of box procedure finish-a-box is executed.

Otherwise (the ELSE of BB16), the situation is such that the run (a,b) of the preceding line and the run (d,e) of the current line overlap and may together constitute a box, providing certain conditions are met.

Figure 8A:
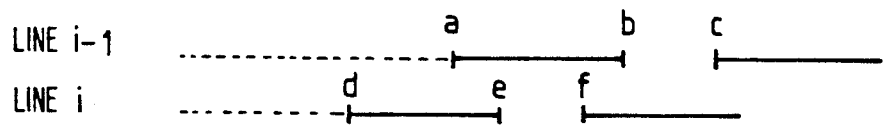

These conditions are verified by the second WHILE function at line BB17. If the run-beginning f is facing a run in the preceding line (FIG. 8A), then it is necessary to make use of the box creation procedure create-a-box().

Figure 8B:
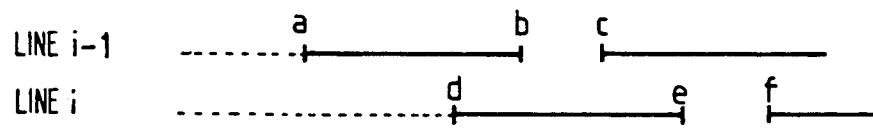

Otherwise (FIG. 8B), the run-end e of the first run on the current line is facing a run in the preceding line which begins at run-beginning c. The current box is therefore terminated at (a,b) and the end of box procedure finish-a-box is performed.

The run (d,e) is then stacked onto the runs that have already been found in the current box, and the procedure moves on to the next run in the preceding line and the next run in the current line.

The person skilled in the art will understand that this constitutes a stepwise scan of the various runs encountered along the current line with the facing runs in the preceding line always being taken into consideration for the purposes of establishing the sets of boxes which are needed to proceed with character recognition operations.

The above-mentioned procedure horizon() has the function of detecting runs situated on a single line.

It has the following parameters:

i which is the index of the scan line as provided by the program calling this procedure; and buffer which is a result vector which is returned to the calling program. This vector contains the beginnings and the ends of the runs detected on line i, and its structure is similar to that of the local variable buff[ ] of the procedure segver() which has already been described.

The global variables of the procedure horizon() are as follows:

image which is a pointer to the image matrix containing the image to be processed;

nl—image and nc—image as already defined; and contraste as already defined.

Its local variables are as follows:

j the current column index;

plage (i.e. "run") is the current index to the vector buffer [ ];

ouv which is a beginning-of-run variable;

fer which is an end-of-run variable; and seuilmaxloc which defines an acceptation threshold for a local maximum representing the middle of a run.

The definition of a run in the case of an image having gray levels takes account of the values of the various pixels which are encountered.

The procedure horizon() is written out formally under subheading CC in the appendix.

By convention, the symbol &x designates the address of the variable x, whereas *x designates the contents of the variable pointed to by x.

The first step in this procedure horizon() naturally consists in setting up the column index j to 1, the run index to the value 0, and attributing a single state buffer[0] = COLMAX for buffer, since no run has been encountered up to the maximum column number.

The WHILE loop at CC4 serves to increment the index j up to the end of the line and on each occasion it determines whether image [i][j] is a local maximum.

If this condition is true, a run is searched for starting from line i and column j, and a new component is given to the vector buffer to mark the beginning of the run and another new component is given to the vector buffer to mark the end of the run. The current run index is incremented by two for the vector buffer, and the new value of j is taken as the end of the run which has just been identified, i.e. j=fer+1.

Otherwise (at CC12), the index j is merely incremented by unity.

The procedure searchregion is given in the appendix under the heading DD.

At DD1, a threshold is set to one-half of the local maximum of image [i][j].

At lines DD2 to DD4, the index of the beginning of the run is decremented so long as the value of j for the beginning of the run remains greater than the beginning of the line and the corresponding intensity value in IMAGE remains greater than the threshold. The result is naturally the value jouv which corresponds to the real beginning of the run.

Similarly, steps DD5 to DD7 perform the same operation in the other direction, going from the middle of the run in order to reach either the end of the line or else an image intensity value at index j which is less than the threshold, thus indicating the end of the run.

Heading EE in the appendix gives the procedure create-a-box.

Its first step consists in dynamically allocating a box structure. Given its simplicity, there is no need to define this structure here in detail. The first run of the allocated structure is initialized to [d,e], and thereafter the other parameters of the box structure are initialized.

From EE4, a second step consists in inserting the newly created box to the left of the box pointed to by the pointer ppave, in the doubly-linked list of boxes that have already been found. The boxes are thus classified by the order in which they appear on the preceding line, which makes it possible to associate the various runs encountered on the current line to said boxes.

The third step at EE6 consists in moving on to the next run in the current line.

The procedure finish-a-box appears under the heading FF in the appendix.

Its first step consists in looking for one or more strokes in the found subobject ppave by detecting one or more sequences of quanta. This step takes place at FF1 using the procedure strokespresent which is described in greater detail below.

The second step consists initially in attributing the box following the box ppave in the list of boxes to the current box, in removing the box ppave from the list of boxes, and in releasing the structure which has been removed.

As a result, garbage is removed from the information contained in the list of boxes whenever garbage is found by the processing for discovering strokes.

If greater memory consumption is possible, it would naturally be possible to begin by establishing all of the boxes, and then subsequently to determine the strokes.

At FF5, a third step consists in moving on to the next run of the preceding line.

Before describing the procedure strokespresent, which appears under heading GG in the appendix, the term "quantum" needs defining.

A quantum is a succession of at least three adjacent runs satisfying the following conditions:

1/ $|a-d| <= 1$ and $|b-e| <= 1$, where a, b and d, e are the beginnings and the ends of successive runs; and 2/ $|n*n| >= S - \text{contact}*S/4 - n + 2$, where n is the number of runs of the quantum, S is the total number of pixels in the quantum, and contact takes the values 0, 1 or 2 depending on the number of links between the quantum and its environment.

The parameters used are as follows:

flag which is a flag having 1 for the first quantum of a stroke to be detected and is otherwise 0;

ppave which is a pointer to the box within which a search is being made for a possible stroke;

pp is the first run of the quantum; and dp is the last run of the quantum.

The local variables are as follows:

contact1 which indicates the existence of contacts 0 or 1 at the bottom of the quantum (i.e. on the upstream end of the quantum);

contact is the number of contacts (0, 1 or 2) relating to the bottom and the top of the quantum (where the top is the downstream end of the quantum);

np is the number of runs in the quantum; and somp which corresponds to S above, expressed as the total number of pixels contained in the quantum.

The first step of the procedure strokespresent consists, at GG1 to GG3, in zeroing the values of ppdq and dpdq respectively repesentative of the first run and the last run in the quantum, whereas the binary variable traitencours is set to false, indicating that no strokes have yet been found. A second step then begins at GG4 with a WHILE operator whose execution condition is that the end of the box pointed to by ppavé has not yet been reached.

If there is a current stroke (GG5), two possibilities arise:

A quantum has been found from the ppdq-th run of the box (line GG7). In this case the end of the run is given the value dpdq and the next quantum is searched for starting from the middle of the preceding quantum, as expressed by lines GG9 to GG11.

Otherwise (GG12), a stroke beginning at debtrait and ending at fintrait has been found. The stroke is memorized and the following stroke is searched for from index fintrait*1.

This is performed by lines GG13 to GG15.

GG16 marks the other term of the initial alternative, i.e. there is no current stroke.

In this case a search is made for the first quantum of a possible stroke (line GG17). If one is found, lines GG19 to GG22 set up a stroke beginning and a stroke end, and then reset ppdq to a value corresponding to the middle of the current quantum.

Otherwise, line GG23 consists in marking the pixels of the runs going from ppdq to dpdq as elements of a characteristic zone in which primitive shapes may be found, and it is recalled that this constitutes one of the essential aspects of the invention.

The procedure quantum() is given under heading HH in the appendix.

Its first step (HH1 to HH3) consists in initializing the number of runs constituting the quantum to 1, in taking the current run as the first run, and naturally in giving the total number of pixels in the quantum, i.e. the variable somp, the number of pixels in this first run.

The second step at HH4 consists in testing whether flag = 1, i.e. whether this is the first quantum of a stroke to be detected.

Depending on whether or not there is a contact at the bottom of the quantum, the variable contact1 is set to 1 or 0, in lines HH7 and HH8 respectively. Otherwise, line HH10 sets the variable contact to 0.

At line HH11 a WHILE operator has an execution condition which is that either the number of runs in the quantum is not yet equal to 3, or else that condition 2 mentioned above in the definition of a quantum is satisfied, which is now written formally.

Lines HH12 to HH14 cause the procedure to return the message "no quantum upto end of box" if it has reached the end of the box.

If the next run goes more than 1 pixel beyond the end of the current run, lines HH15 to HH18 cause the procedure to return the message "no quantum upto end of current run".

Thereafter, the next run becomes the current run, the number of runs in the quantum is incremented np, and the variable somp is incremented by the appropriate amount to represent the total number of pixels in the quantum by adding in the pixels of the current run.

Thereafter, line HH22 tests whether this is the first quantum of a stroke to be detected, and whether there is a top contact, line HH25 gives the variable contact the value contact1 + 1, taking account of this top contact.

Otherwise, line HH26 gives the variable contact the value of contact1.

Then line HH27 returns the message "a quantum has been found constituted by the runs from pp to the current run".

The person skilled in the art will now understand that a stroke may be defined as a sequence of quanta which overlap partially. And, by definition, it is recalled that a quantum is a succession of at least three adjacent runs which satisfy the above-mentioned conditions.

The structure trait is written formally in the C language under the heading JJ in the appendix, together with various comments to assist in understanding.

It is clear that in order to obtain a complete definition of the strokes appearing in the image, it is necessary not only to scan horizontally using the procedure verticalsegment() which has been described in detail above, but also to proceed with a vertical scan using a procedure horizontalsegment() which uses the same procedures as those described above.

The detailed description of these procedures is not given here since the person skilled in the art will have no difficulty in transposing the procedure verticalsegment() to horizontalsegment().

Figure 3A:
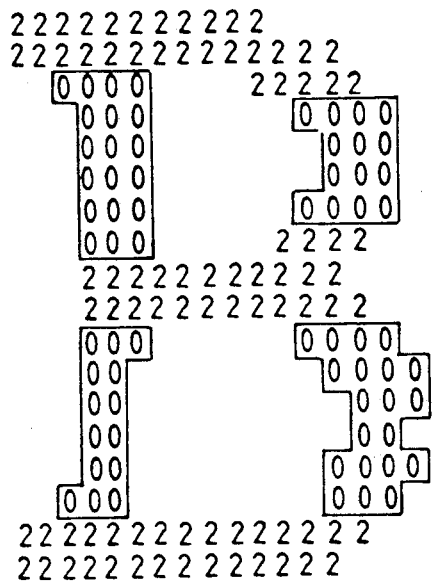
FIGS. 3A and 3B are two diagrams showing the use of horizontal scanning and vertical scanning respectively for recognizing the character B.
Figure 3B:
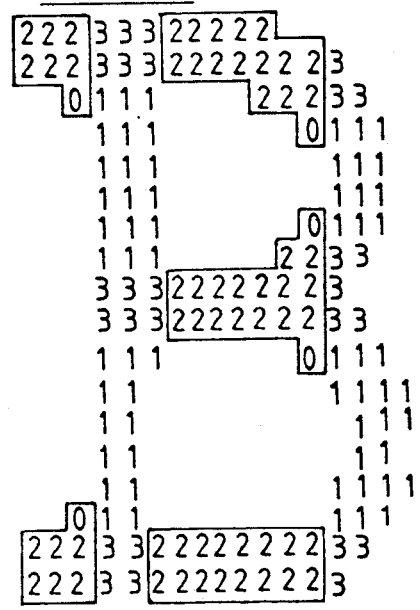

Reference is now made to FIGS. 3A and 3B.

In a first stage, the pixels of the matrix trace belonging to vertical strokes are encoded by 0, and the pixels belonging to a character (i.e. which are different from the background) are encoded by a 2.

The result of this for the letter B can be seen in FIG. 3A.

When the other scan is performed, a second stage consists in adding 0 to pixels belonging to horizontal strokes and 1 to other pixels.

The result of doing this is shown in FIG. 3B.

This figure clearly shows that at the end of stroke detection, the elements of the matrix trace that do not belong to any kind of stroke form characteristic zones whose pixels are encoded by 3. The pixels encoded by 0 represent the intersection of two strokes.

It is now possible to define characteristic zones which are constituted by sets of adjacent pixels that do not belong to any stroke. The declaration of a characteristic zone is expressed in the C language under heading KK of the appendix, together with comments.

The characteristic zones can now be detected by a procedure detzone() which scans through the matrix trace. Here again, the characteristic zones are arranged in a doubly-linked list, as described above.

The person skilled in the art will understand that the characteristic zones are defined firstly as a function of their nature, and secondly as to their orientation relative to the, or each, stroke touching them.

Figure 4:
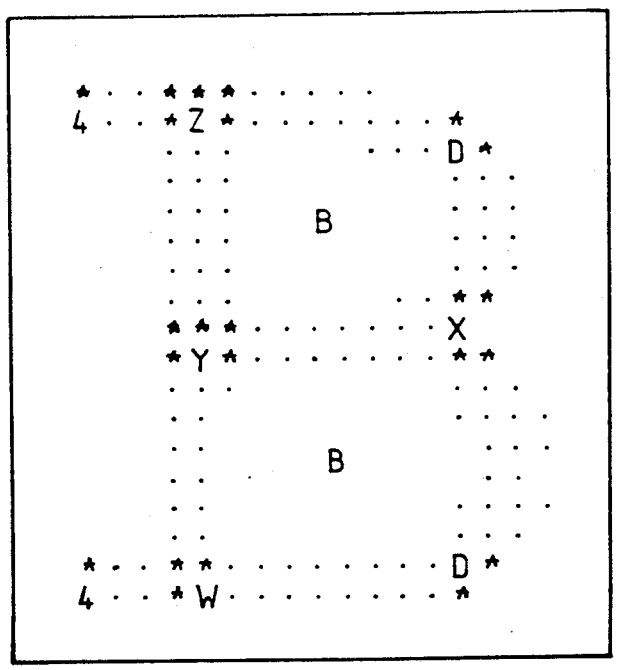
FIG. 4 is an explanatory diagram showing the invariant structure of the character B.

The result of the method in accordance with the invention as performed so far can now be expressed diagrammatically by examining FIG. 4 which can be used for recognizing the letter B.

In FIG. 4:
the ends of strokes are marked with a 4;
changes of direction are marked with a D;
triple branches are marked X, Y, Z, and W (in order to keep track of their differences concerning the orientations of the strokes touching said triple branches); and
loops are marked with a B.

It is recalled that these are the only items used for representing a character, and that they are encoded depending on the direction of the, or each, stroke coming into contact with them.

The above description relates to module M2 in FIG. 1.

Thereafter, module M3 uses the respective positions of the zones having the characteristics of primitive shapes as supplied by module M2 in order to obtain invariant descriptions which are particularly well suited to recognizing characters.

The Applicant has observed that scanning by means of a moving straight line (or more generally by a moving curve) makes it possible to obtain a fully ordered list of the primitive elements, in which the order depends on the plane topology of these primitive elements or shapes.

For example, a point may be selected (optionally within the matrix in which the character is inserted), and a radius is caused to pivot about said point. An ordered list of the primitive shapes is obtained by noting the various primitive shapes encountered by said radius in the order in which they are intercepted.

The person skilled in the art will understand that this order is invariant as a function of plane projections of the original figure, provided that the radius scanning the projection is itself the projection of the corresponding radius for the original figure.

This may lead to the scan being selected as a function of the transformations to which the characters are subjected when written on the paper medium that receives them.

In practice, it has been observed that the most frequent transformations are horizontal or vertical anamorphoses.

That is why it is currently considered preferable to scan the matrix in which the character is inserted purely and simply by means of horizontal and vertical scans, i.e. the points about which the scan lines rotate are placed at infinity. These scans are particularly easy to perform in a square or rectangular matrix as are scans using parallel lines at a slope of ±45° relative to the limits of the square matrix.

In a triangular matrix, the three scans chosen would be parallel to the three lines defining the pixels, in a tessellation matrix (0, +60°, −60°).

The results of two scans of this type on FIG. 4 are now considered. These results are as follows:
horizontal scan: 4 Z D B X Y B D 4 W
vertical scan: 4 4 Z Y W B B D X D.

The order obtained in this way is fully ordered, in other words it does not take account of the fact that zones may be encountered simultaneously by the scan lines.

In accordance with a particularly advantageous aspect of the invention, it is preferable to use partial ordering: if two characteristic zones are encountered simultaneously by the scan line, they are enclosed between parentheses, thereby indicating that their order is immaterial.

The above lists then become partially ordered lists which may be expressed as follows:
horizontal scan: (4 Z D) B (X Y) B (4 W D)
vertical scan: (4 4) (Z Y W) (B B) (D X D).

Naturally, the nature of the scans used is fixed once-and-for-all in advance, in other words it is "predetermined".

It is then possible to store standard descriptions in the memory module M5 of FIG. 1 in the form of two partially ordered lists of primitive shapes both associated with a given character shape. For example, the above lines would naturally be associated with the character B.

Naturally, the present invention is not limited to using scans based on parallel straight lines, nor is it limited to using only two partially ordered lists, since the number of partially ordered lists may be increased in order to increase character recognition performance, if necessary.

Further, the partially ordered lists may be obtained by scanning using curves such as circles of different sizes, deformable spirals, or other curves. The feature that needs to be ensured is that the resulting representation is as invariant as possible in the face of likely geometrical transformations in the representation of a set of characters input to the system, which transformations include, in particular, their size, their plane projection, and the various small deformations they may include.

The module M4 performs character recognition per se.

It is explained above how the memory M5 contains standard descriptions of primitive shapes which are associated, for example, in pairs, with given characters.

In accordance with an advantageous aspect of the invention, access to the memory M5 which is advantageously organized as a data base, is made faster by the fact that the descriptions it contains are classified by non-disjoint classes.

Access to a class is obtained by the hash-code process.

For this process, the interrogation vector is based on the presence or absence of a certain number of primitive shapes of the type (c), (d), and (e) defined above, i.e. cusps, crosses or branching points having three or more branches, and closed loops, respectively.

The type (d) comprising crosses or branches having at least three branches is particularly advantageous for searching purposes, in particular because the simultaneous use of two partially ordered lists makes this type easy to locate in the matrix.

When searching through the standard descriptions of the data base contained in the module M5, another important discriminating element is the length of a partially ordered list.

The module M4 therefore compares an unknown description X coming from the module M3 with the standard descriptions Y coming from the memory M5. The choice of standard descriptions is thus performed as explained above. Comparison per se may use a conventional character string comparison technique, such as:

"dynamic programming"; or
the suboptimal maximum slope method.

These two methods are described, for example, in "Reconnaissance des Forms par Algorithmes", by J. C. Simon, published by Masson in 1984.

The advantage of the suboptiam maximum slope method is that it is of order n, whereas dynamic programming is of order $n^2$, and therefore becomes much less advantageous when the size of the data base is large. The result of each comparison is a distance $d(X,Y)$ between the unknown description X and a standard description Y.

The standard descriptions Y corresponding to the shortest distances are selected. When the invention is implemented pratically, it is frequently found that there are one or more descriptions Y for which $d(X,Y)=0$.

Naturally, the various different known descriptions Y for which the distance is zero all relate to the same character.

Exceptionally, the distance d will be greater than a threshold, in which case the module M4 rejects the unknown list.

A test is then performed which may show up an anomaly in the primitive shape zones, generally representative of an abnormal thickening in the character to be identified.

The fining module M6 is then used.

This module M6 takes the matrix provided by the module M1 and fines it by an erosion method, which does not go right down to the skeleton of the character (thickness of 1 pixel), but which stops when a minimum thickness of two or three pixels is reached.

The new data is then subjected successively to the modules M2, M3, and M4, and in the vast majority of cases a character is then correctly recognized.

The invention has been applied essentially to average quality printed characters and it has given excellent results therewith.

It is also given good results with isolated handwritten characters, such as digits or block capitals.

On the basis of initial testing, the invention may also be applied to any line image, in particular to handwritten words which, unlike the characters mentioned above, include characters which are joined-up. These initial tests have shown that it is possible to identify an unknown word taken from a hundred or so such words written by the same person.

APPENDIX 1

AA—Procedure strokes given( )

```
        IF (end of source file)
            THEN
            RETURN(0);
AA5     ELSE
            read number of lines: nl_image;
            read number of columns: nc_image;
            read background value: fond;
            clear the matrix TRACE to 0;
AA10        initialize the matrix IMAGE to G|i||j|, the sampled
            image as read minus the background value:
                IMAGE|i||j| = max((G|i||k|-fond), 0);
                              i,j
            calculate the contrast
contraste = max IMAGE|i||j|;
            i,j
        RETURN(1)
```

APPENDIX 2

BB       PROCEDURE vertical segment( )

1st step:

BB1         initialize the variables;

2nd step:

BB2    WHILE there remain lines in the matrix IMAGE, REPEAT put a, b, c to the beginning of the runs in the preceding line;

BB5    horizon(i,buff);

put d, e, f to the beginnings of runs of the current line:

BB7    WHILE there remain runs on the preceding line or the current line, REPEAT IF (e < a)

BB10 THEN

BB11    create-a-box (pavé-courant);

BB12 ELSE

IF (d > b)

BB14    THEN finish-a-box (pavé-courant);

BB16 ELSE

BB17    WHILE (f < b) OR (e > c) REPEAT

IF (f < b)

THEN create-a-box (pavé-courant);

ELSE finish-a-box (pavé-courant).

Stack the run |d,e| with the runs already found in the current box;

move on to the next run of the preceding line;

move on to the next run of the current line;

APPENDIX 3

CC    PROCEDURE horizon(i,buffer)

1st step:

CC1    j = 1;
plage = 0;
buffer|0| = COLMAX;

2nd step:

CC4    WHILE (j<end of line) REPEAT

IF IMAGE|i||j| is a local maximum

```
            THEN
                  search region (i,j,jouv,jfer)
                  buffer|plage| = ouv;
                  buffer|plage + 1| = fer;
                  plage = plage +2;
                  j = fer + 1;
CC12      ELSE
                  j = j + 1;
```

APPENDIX 4

```
DD      PROCEDURE    search    region
(i,j,&ouv,&fer)

seuil = IMAGE|i||j|/2
DD2     WHILE ((*jouv > beginning of line) AND
               (IMAGE |i||*jouv|>seuil))
        REPEAT
DD4         *jouv = *jouv -1;
DD5     WHILE ((*jferm < end of line) AND (IMAGE|i||*jferm|>seuil)
        REPEAT
DD7         *jferm = *jferm +1;
```

APPENDIX 5

```
EE      PROCEDURE create-a-box (ppavé)
```

1st step:

EE1      allocate a box structure dynamically;
         initialize the first run of the allocated structure
         to |d,e|;
         initialize the other parameters of the box structure;

2nd step:

EE4      insert the box created to the left of the box pointed
         to by ppave in the doubly-linked list of boxes
         already found;

3rd step:

EE6      move on to the next run of the current line;

APPENDIX 6

FF     PROCEDURE finish-a-box (ppavé)

1st step:

FF1     traitever(ppavé);

2nd step:

attribute the current box to the box which follows the box ppave in the list of boxes;
        remove the box ppavé from the list of boxes;
        release the structure that has been removed;

3rd step:

FF5     move on to the next run of the preceding line;

APPENDIX 7

GG     PROCEDURE strokespresent (ppavé)

1st step:

```
GG1        ppdq = 0
           dpdq = 0;
GG3        traitencours = FALSE;
```

2nd step:

```
GG4             WHILE (ppdq<=ppavé->end) REPEAT
GG5                 IF(traintencours)
                    THEN
GG7                     IF(quantum (0,ppave,ppdq,&dpdq))
                        THEN
GG9                         Fintrait = dpdq;
                            ppdq = (ppdq + dpdq + 1)/2;
GG11                        traitencours = 1;
GG12                    ELSE
GG13                        memotrait(ppave, debtrait, fintrait);
                            ppdq = fintrait + 1;
GG15                        traitencours = 0;
```

```
GG16            ELSE
GG17                    IF(quantum(1,ppave,ppdq,&dpdq))
                        THEN
GG19                            debtrait = ppdq;
                                fintrait = dpdq;
                                ppdq = (ppdq + dpdq + 1)/2;
GG22                            traitencours = 1;

ELSE
GG23                            mark the pixels of the runs from
                                ppdq to dpdq as being elements of
                                a zone.
```

APPENDIX 8

HH    PROCEDURE quantum(flag,ppave,pp,dp)

1st step:

HH1   Initialization: np = 1;
      The first run is the current run;
HH3   somp=the number of pixels in the first run pp;

2nd step:

```
HH4   IF flag = 1
        THEN
HH6         IF there is contact at the bottom
HH7             THEN contact1 = 1;
HH8             ELSE contact1 = 0;
        ELSE
HH10        contact = 0
HH11  WHILE np<3 OR (np*np + contact*somp/4)< (somp+2-np)
HH12      IF end of box reached
            THEN
HH14            RETURN ("no quantum upto end of box")
HH15      IF the following run overlaps the current run by
          more than one pixel
            THEN
HH18            RETURN ("no quantum upto end of current
                run");
```

The next run becomes the current run;

np = np + 1;

somp=somp+number of pixels in the current run;

HH22    IF flag = 1

THEN

IF there is contact at the top

HH25        THEN contact = contact1 + 1;

HH26        ELSE contact = contact1;

HH27 RETURN("a quantum has been found constituted by the runs from pp to the current run").

APPENDIX 9

JJ    Struct strokes int orient;

orient = 1 for a vertical stroke (line scanning)

0 for a horizontal stroke (column scanning);

int idt;

line (or column) index for a line (or column) scan of the first vertical (horizontal) segment run int ipf;

the bottom run index is:

0 if the end of the bottom is linked min|(fin-2/2,mediane-1| if the end of the bottom is free int ips;

the index of the top run is:

0 if the end of the top is linked min|(fin-2)/2,mediane-1| if the end of the top is free float lonsular; lonsular = (fin + 1)/mediane int markfond;

direction of Freeman arriving at the end of the bottom int marksommet;

direction of Freeman arriving at the end of the top int fond;

fond = 0 if the end of the bottom is connected to
          another box
       1 if the end of the bottom is free int sommet;
       sommet = 0 if the end of the top is connected to
            another box
         1 if the end of the top is free int fonduse;
       fonduse = 0 if the end of the bottom is not yet used
              1 if it has been used for calculating the
              number of branches arriving at said end int sommetuse;
       sommetuse = 0 if the end of the top has not been used
              1 if it has been used for calculating the
              number of branches arriving at this end struct couple *dfp;
       (trait->dfp+k)->x is the beginning of the k-th run
       (trait->dfp+k)->y is the end of the k-th run
int fin; number of runs less 1
struct trait *ts; pointer to the next element
struct trait *tp; pointer to the preceding element
;

APPENDIX 10

KK      Struct zonecharacteristic int orient;
            orient = 1 for a vertical stroke (line scan)
                 0 for a horizontal stroke (column scan)

int tdir|8|;
            tdir|i| = 1 if there exists a stroke pointing to
                 next zonecharacteristic in direction i
                = 0 otherwise int tplage|40||3|;
            tplage|k||0| is the line index of the k-th run
            tplage|k||1| is the index of the beginning of
                 the k-th run tplage|k||2| is the index of the end of the k-th run int fin; number of runs less 1 struct zonecharacteristic *zs; pointer to the next element struct zonecharacteristic *zp; pointer to the preceding element struct zonecharacteristic *zls; pointer to the linked characteristic zones struct zonecar *zlp;

;

The characteristic zones detected by the procedure detzone() which scans through the matrix trace form a doubly-linked list.

The characteristic zones detected by the procedure detzone() which scans through the matrix trace form a doubly-linked list.

I claim:

1. A method of processing digital signals representative of image lines, and in particular of characters, the method comprising the steps of:
    a) isolating each elementary shape and character, and framing said each shape and character in a matrix having a predetermined configuration, in particular a rectangular configuration; and
    b) performing a search inside the matrix for primitive shapes of predetermined types, said primitive shapes being referred to as first level primitive shapes;
    wherein operation b) comprises:
    b11) searching inside the matrix for quanta, with each quantum being defined as a homogeneous block having a minimum number of pixels having intensity greater than a local threshold;
    b12) detecting a plurality of sequences of overlapping quanta, with each sequence being representative of a stroke; and
    wherein adjacent strokes recognized in this way are subtracted from the matrix, thereby leaving characteristic zones containing said primitive shapes, wherein the first level primitive shapes comprises:
    the ends of strokes;
    changes in direction;
    cusps;
    crosses or branching points having at least three branches; and
    closed loops.

2. A method of processing digital signals representative of image lines, and in particular of characters, the method comprising the steps of:
    a) isolating each elementary shape and character, and framing said each shape and character in a matrix having a predetermined configuration, in particular a rectangular configuration; and
    b) performing a search inside the matrix for primitive shapes of predetermined types, said primitive shapes being referred to as first level primitive shapes;
    wherein operation b) comprises:
    b11) searching inside the matrix for quanta, with each quantum being defined as a homogeneous block having a minimum number of pixels having intensity greater than a local threshold;
    b12) detecting a plurality of sequences of overlapping quanta, with each sequence being representative of a stroke; and
    wherein adjacent strokes recognized in this way are subtracted form the matrix, thereby leaving characteristic zones containing said primitive shapes.

3. A method according to claim 2, wherein step b11) comprises:
    scanning through the matrix by means of at least one predetermined scanning line which is moved parallel to itself in translation, with a current run being defined by a stack of pixels encountered by the scanning line having an intensity greater than a background intensity, said current run being considered as a first run at the beginning of scanning;
    searching for contacts being the current run, one or more upsteam runs, and also one or more downstream runs in the scanning direction; and
    recognizing that a quantum is present when a predetermined contact condition is satisfied between adjacent runs.

4. A method according to claim 1, further including:
    e) scanning the characteristic zones by means of at least one line having predetermined motion, in order to establish an ordered list of characteristic zones each having one of the primitive shapes identified therein; and
    f) comparing said list of primitive shapes obtained in this way with a set of character descriptions contained in memory.

5. A method according to claim 4, wherein the lists of primitive shapes are partially ordered, with primitive shapes which are encountered simultaneously during scanning being collected together in any order.

6. A method according to claim 5, wherein each matrix is subjected to at least two predetermined scans, which are associated with respective partially ordered lists, said lists being compared with partially ordered lists contained in memory, with each character or shape to be recognized being associated with at least one such lists.

7. A method according to claim 4, wherein the lists constituting invariant descriptions in the memory are classified by non-disjoint classes Ai.

8. A method according to claim 7, wherein the lists obtained are compared with the lists in a memory by calculating the distance between lists of characters to be compared within a class Ai.

9. A method according to claim 8, wherein, when the distance exceeds a threshold, the following steps are additionally performed:
  g) the character to be identified is eroded in order to reduce its thickness; and
  h) steps b) to f) are performed again.

10. An apparatus for processing digital signals representative of image lines, and in particular of characters, the apparatus comprising:
  a) means for isolating each elementary shape and character, and means for framing said each shape and character in a matrix having a predetermined configuration, in particular a rectangular configuration; and
  b) means for searching inside the matrix for primitive shapes of predetermined types, said primitive shapes being referred to as first level primitive shapes;
  wherein said searching means comprises:
  b11) means for searching inside the matrix for quanta, with each quantum being defined as a homogeneous block having a minimum number of pixels having intensity greater than a local threshold;
  b12) means for detecting a plurality of sequences of overlapping quanta, with each sequence being representative of a stroke;
  b13) means for subtracting from the matrix adjacent strokes recognized in this way, thereby leaving characteristic zones containing said primitive shapes.

11. Apparatus for processing digital signals representing image lines, to identify shapes and characters, as recited in claim 10, comprising:
  means for segmenting and framing characters, said means being suitable for receiving image data from an imaging system;
  means for recognizing primitive shapes by subtracting strokes;
  means for describing the primitive shapes as at least one list obtained which is in general partially ordered;
  means for storing character descriptions in the forms of predetermined reference lists;
  means for comparing the lists obtained with the reference lists; and
  means for identifying a character as matching a character which gives the smallest distance between the lists obtained and the reference lists.

12. Apparatus according to claim 11 further comprising:
  fining means for reducing the thickness of a character prior to reapplying it to the means for recognizing primitive shapes.

13. An apparatus for processing digital signals representative of image lines, and in particular of characters, the apparatus comprising:
  a) means for isolating each elementary shape and character, and means for framing said each shape and character in a matrix having a predetermined configuration, in particular a rectangular configuration; and
  b) means for searching inside the matrix for primitive shapes of predetermined types, said primitive shapes being referred to as first level primitive shapes;
  wherein said searching means comprises:
  b11) means for searching inside the matrix for quanta, with each quantum being defined as a homogeneous block having a minimum number of pixels having intensity greater than a local threshold;
  b12) means for detecting a plurality of sequences of overlapping quanta, with each sequence being representative of a stroke;
  b13) means for subtracting form the matrix adjacent strokes recognized in this way, thereby leaving characteristic zones containing said primitive shapes;
  (c) means for segmenting and framing characters, said means being suitable for receiving image data from an imaging system;
  (d) means for recognizing primitive shapes by subtracting strokes;
  (e) means for describing the primitive shapes as at least one list obtained which is in general partially ordered;
  (f) means for storing character descriptions in the forms of predetermined parenthesized reference lists;
  (g) means for comparing the lists obtained with the reference lists; and
  (h) means for identifying a character as matching the character which gives the smallest distance between the lists obtained and the reference lists, wherein the primitive shapes comprise:
  the ends of strokes;
  changes in direction;
  cusps;
  crosses or branching points having at least three branches; and
  closed loops.

14. Apparatus according to claim 13, further including:
  fining means suitable for reducing the thickness of a character prior to reapplying it to the means for recognizing primitive shapes.

* * * * *